Jan. 21, 1969  R. BRINSON ET AL  3,422,854
MANUFACTURE OF FIREHOSE
Filed Nov. 30, 1965
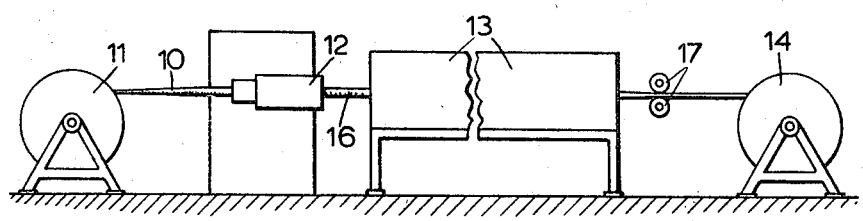
— FIG. 1 —
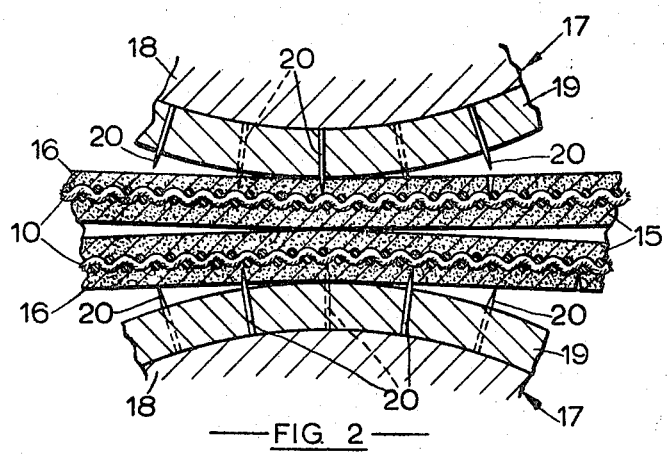
— FIG. 2 —
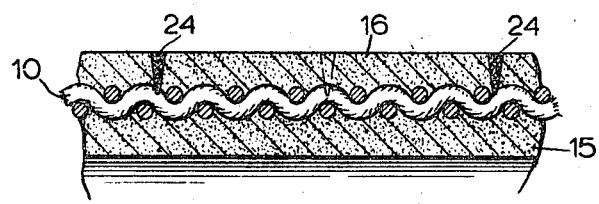
— FIG. 4 —
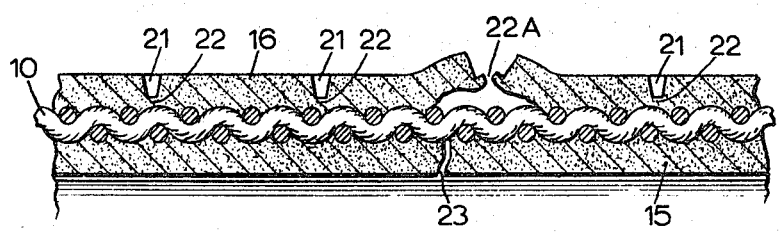
— FIG. 3 —
INVENTORS:
ROGER BRINSON
ALAN RODRIGUEZ 3,422,854
MANUFACTURE OF FIREHOSE
Roger Brinson, Halton, near Lancaster, and Alan
Rodriguez, Halton, England, assignors to George
Angus & Company Limited, Newcastle-upon-Tyne,
England, a corporation of Great Britain
Filed Nov. 30, 1965, Ser. No. 510,602
Claims priority, application Great Britain, Dec. 1, 1964,
48,796/64
U.S. Cl. 138—137   6 Claims
Int. Cl. F16l 11/04

ABSTRACT OF THE DISCLOSURE

A firehose which consists of a textile jacket having an impermeable lining of rubber or plastics material and an outer cover of rubber or plastic material, the cover having in it a multiplicity of small holes or cuts which are sealed to prevent access of water to the jacket through the cover but are capable of opening, in the event of puncture of the lining, to permit of escape through them of water contained in the hose.

---

Flexible hose, such for example as firehose, having a textile jacket and a lining of rubber or plastics material is frequently provided with an abrasion-resistant outer cover of rubber or plastics material, the lining and outer cover being impermeable to liquids. In the event of the lining of such a hose becoming pierced, liquid under high pressure which escapes through the hole in the lining tends to lift the cover from the jacket in the form of a large blister.

The invention provides a flexible hose comprising a textile jacket having an impermeable lining of rubber or plastics material and an outer abrasion-resistant cover of rubber or plastics material which prevents absorption of water by the jacket through the cover but is so weakened at a multiplicity of points that when liquid under pressure penetrates the lining from the interior of the hose to the underside of the cover local failure of the cover will occur at such weakened points, thereby preventing pressure beneath the cover from building up sufficiently to detach a substantial area of the cover from the jacket.

Thus the cover of the hose may be provided with a multiplicity of small holes or cuts which either extend only partially through the cover or are subsequently sealed, so as to deny access to the jacket of external water, but which will open to permit escape of high pressure fluid from the hose in the event of puncture of the lining. The holes or cuts may penetrate only partially through the cover so that a thin diaphragm of rubber or plastic material is left between the bottom of each hole and the jacket, these diaphragms bursting in the event of leakage of high pressure liquid through the lining to allow the liquid to escape to the exterior of the hose without lifting the cover from the jacket.

Alternatively I may arrange for the holes to extend through the full thickness of the cover and afterwards seal them with a suitable material. This procedure is desirable when the hose is to be subjected to vulcanization in manufacture, since the holes permit of escape of gases and steam generated during vulcanization and can afterwards be blocked.

The cover of the hose according to the invention is thus effective to prevent the jacket from absorbing water through the cover, for example when the hose is laid in a wet roadway or a water-filled ditch, but nevertheless will not lift as a blister from the jacket in the event of damage to the lining of the hose.

The invention will now be further explained with reference to the accompanying diagrammatic drawings, in which:

FIG. 1 is a side elevation showing apparatus for manufacturing a hose according to the invention, FIG. 2 is a sectional view illustrating the piercing of the cover of the hose, and FIGS. 3 and 4 are sectional views through the wall of two alternative forms of hose according to the invention.

FIG. 1 illustrates apparatus including an extrusion head 12 of the character described in Laubarede British Patent No. 856,955, or in Ashton United States Patent No. 3,191,230, "Machines for Extruding Tubes," in which a woven textile jacket drawn from a pay-out reel 11 is provided simultaneously with a lining and an outer cover of rubber or plastics material by extruding the rubber or plastics material through the jacket from the outside. The jacket 10 is drawn from the pay-out reel 11 through the extrusion head 12 and a cooler 13 by the pull of a take-up reel 14. As the result of its passage through the extrusion head 12, the jacket 10 is provided with an impermeable lining 15 and an impermeable outer cover 16 (see FIGS. 2-4) of the rubber or plastic material. On its way from the cooler 13 to the take-up reel 14 the hose passes between a pair of spiked rollers 17.

As shown in FIG. 2, each spiked roller 17 has a steel core 18 surrounded by a brass shell 19 which carries a number of projecting pins 20. The pins 20, which have sharp points, may have a diameter of 0.025" at their roots and be arranged 0.19" apart in axial rows on each roller, the rows being spaced 0.35" on the shells 19 which have an external diameter of 4⅜", the pins on adjacent rows being staggered. The cover 16 of the hose is thus formed with a multiplicity of minute frusto-conical holes. As already noted, however, it is possible to form the cover with small cuts as an alternative to holes.

The holes 21 may extend only partially through the cover 16 as shown in FIG. 3, terminating at their inner ends in thin diaphragms 22. In the event of a puncture 23 in the lining, water escaping under high pressure from the interior of the hose will fracture one or more of the diaphragms, as indicated at 22A, and escape through the resultant passage or passages formed in the cover 16. The cover 16 does not therefore lift in a large blister from the jacket 10.

Alternatively, as shown in FIG. 4, the holes may extend for the full thickness of the cover 16 and be sealed after formation by some suitable material indicated at 24. The holes can be effectively sealed against the passage of water from the exterior of the hose by applying to the exterior of the hose a liquid water repellant material, for example a silicone emulsion, and subsequently drying the hose. Alternatively the holes may be positively blocked by means of a suitable material, e.g., wax, nitrile rubber latex, polyvinyl chloride or a film-forming plastics latex or emulsion, nitrile rubber latex, natural rubber latex, or an internally plasticised polyvinyl chloride copolymer emulsion.

The holes can be sealed by any of the following procedures:

(1) The hose is dilated by introducing steam at low pressure into it and a suitable wax, e.g., silicone furniture polish, is then applied to the exterior of the cover with a cloth. This blocks the holes in the cover with wax, surplus wax being wiped off. The internal steam pressure is then relieved and the hose left to cool. The wax prevents water from passing from the exterior of the hose to the jacket, but will nevertheless blow out to relieve the internal water pressure in the event of puncture of the lining.

(2) The hose after vulcanization, is placed in a vacuum impregnation tank and impregnated with nitrile rubber latex. The surplus is then removed by passing the hose through a water bath. The latex passes down the pinholes and into the jacket at the bottom of the pinholes and then blocks the pinholes, thus effectively preventing the ingress of water. The holes will open to relieve internal water pressure in the event of puncture of the lining.

(3) The hose is inflated and passed through a circular hose in a diaphragm arranged to spread a thin film of wax, polyvinyl chloride plastisol or other suitable material on to the surface of the hose and into the holes.

(4) The hose is passed between rolls immersed in a water repellent solution, e.g., of silicone resin in white spirit, and afterwards dried.

What we claim as our invention and desire to secure by Letters Patent is:

1. A firehose which consists of a textile jacket, an impermeable lining within said jacket and an outer protective cover external to the jacket, both said lining and said cover being made of a material selected from the group consisting of rubber and plastics material, and said cover having in it a multiplicity of small apertures which are sealed to prevent access of water to the jacket through the cover but are capable of opening, in the event of puncture of the lining, to permit of escape through them of water contained in the hose.

2. A hose as claimed in claim 1, in which the apertures extend only partially through the cover and are sealed at their inner ends by material of the cover.

3. A hose as claimed in claim 1, in which the apertures extend throughout the thickness of the cover and are sealed by introduced sealing material.

4. A hose as claimed in claim 3, in which the sealing material is wax.

5. A hose as claimed in claim 3, in which the sealing material is a material selected from the group consisting of rubber and plastics material.

6. A hose as claimed in claim 1, in which the lining and cover are constituted by a unitary extrusion of said selected material.

References Cited

UNITED STATES PATENTS

| | | | |
|---|---|---|---|
| 446,663 | 2/1891 | Denny | 138—137 X |
| 504,397 | 9/1893 | Marsh | 138—124 X |
| 2,461,594 | 2/1949 | Flounders | 138—137 |
| 2,750,232 | 6/1956 | Szantay et al. | 138—118 X |
| 2,272,704 | 2/1942 | Harding | 138—121 |
| 2,160,371 | 5/1939 | Schnabel | 138—137 X |
| 2,891,581 | 6/1959 | Roberts | 138—121 |
| 3,011,525 | 12/1961 | Randle et al. | 138—137 X |
| 3,168,910 | 2/1965 | Galloway et al. | 138—137 |
| 3,191,230 | 6/1965 | Ashton | 18—13 |

FOREIGN PATENTS

| | | |
|---|---|---|
| 962,381 | 7/1964 | Great Britain. |
| 1,093,148 | 1/1959 | Germany. |

HOUSTON S. BELL, JR., *Primary Examiner.*

U.S. Cl. X.R.

138—177